Patented May 12, 1953

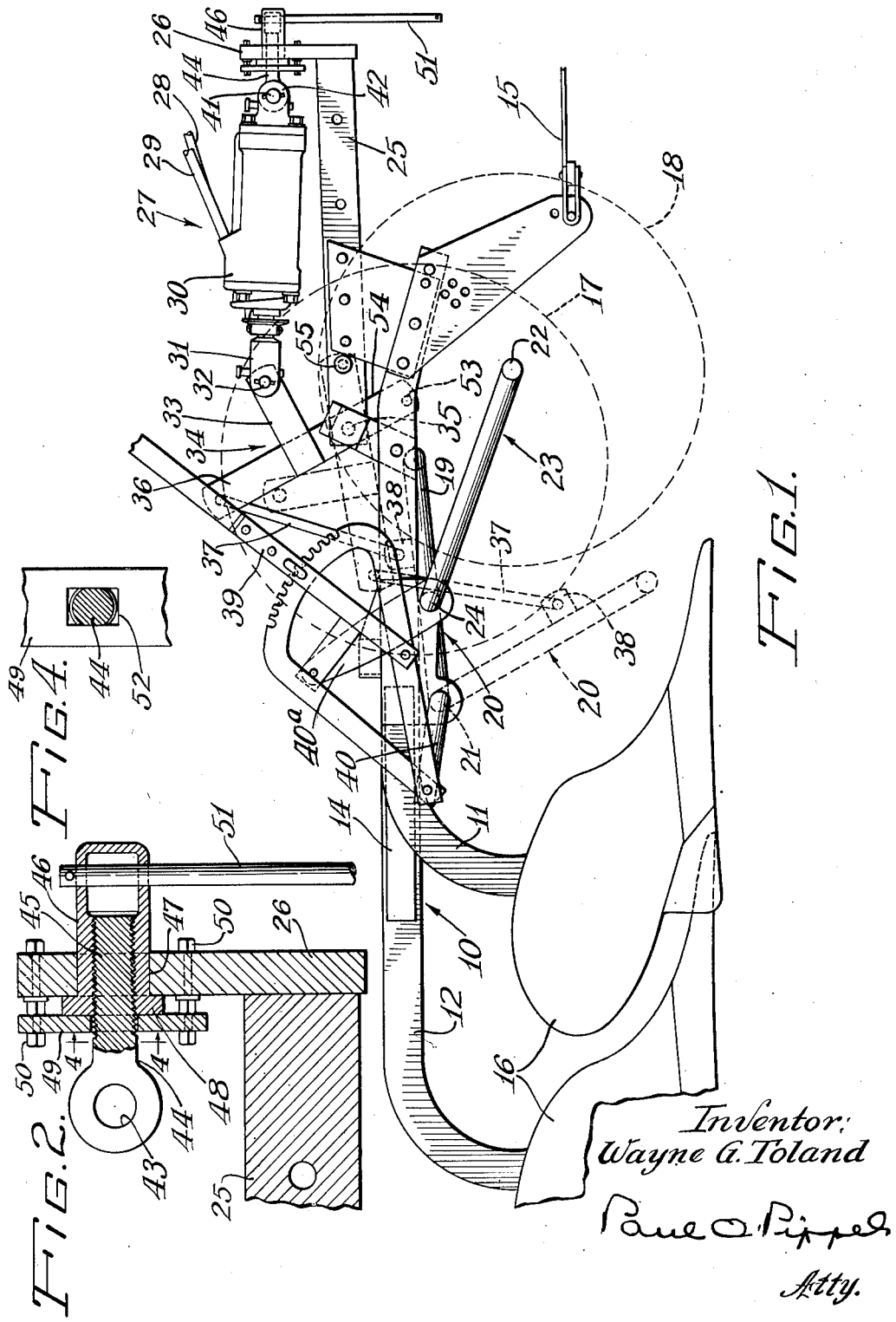

2,638,044

UNITED STATES PATENT OFFICE 2,638,044

POWER-LIFT ATTACHMENT FOR IMPLEMENTS

Wayne G. Toland, Canton, Ill., assignor to International Harvester Company, a corporation of New Jersey Application December 22, 1948, Serial No. 66,739

3 Claims. (Cl. 97—46.27)

1

This invention relates to agricultural implements and particularly to control mechanism therefor. More specifically the invention concerns an attaching structure by which a remotely controlled ram unit is mounted upon an implement of the trailing type, such as a plow, adapted to be drawn by a tractor.

An object of the invention is to provide an improved mounting for a hydraulic cylinder and piston unit upon a plow or other trail-behind implement.

Another object of the invention is to provide in a trail-behind implement having a hydraulic ram for raising and lowering the earth-working tools and detachable therefrom, improved means for facilitating detaching and reattaching the ram unit when the ram unit is to be removed for use upon other implements and the like.

Another object of the invention is to provide in an attaching structure for mounting a remotely controlled ram unit upon a trail-behind implement, means selectively operable for providing depth adjustment in addition to that provided by the ram unit.

Other objects and advantages of the invention will become clear from the following detailed description when read in conjunction with the accompanying drawings, wherein:

Fig. 1 is a view in side elevation of a two-bottom plow adapted for connection to a tractor and embodying the features of the present invention;

Fig. 2 is an enlarged detail partly in section showing a portion of the attaching structure by which the ram unit is mounted upon the implement;

Fig. 4 is a section taken on the line 4—4 of Fig. 2.

Figure 3:
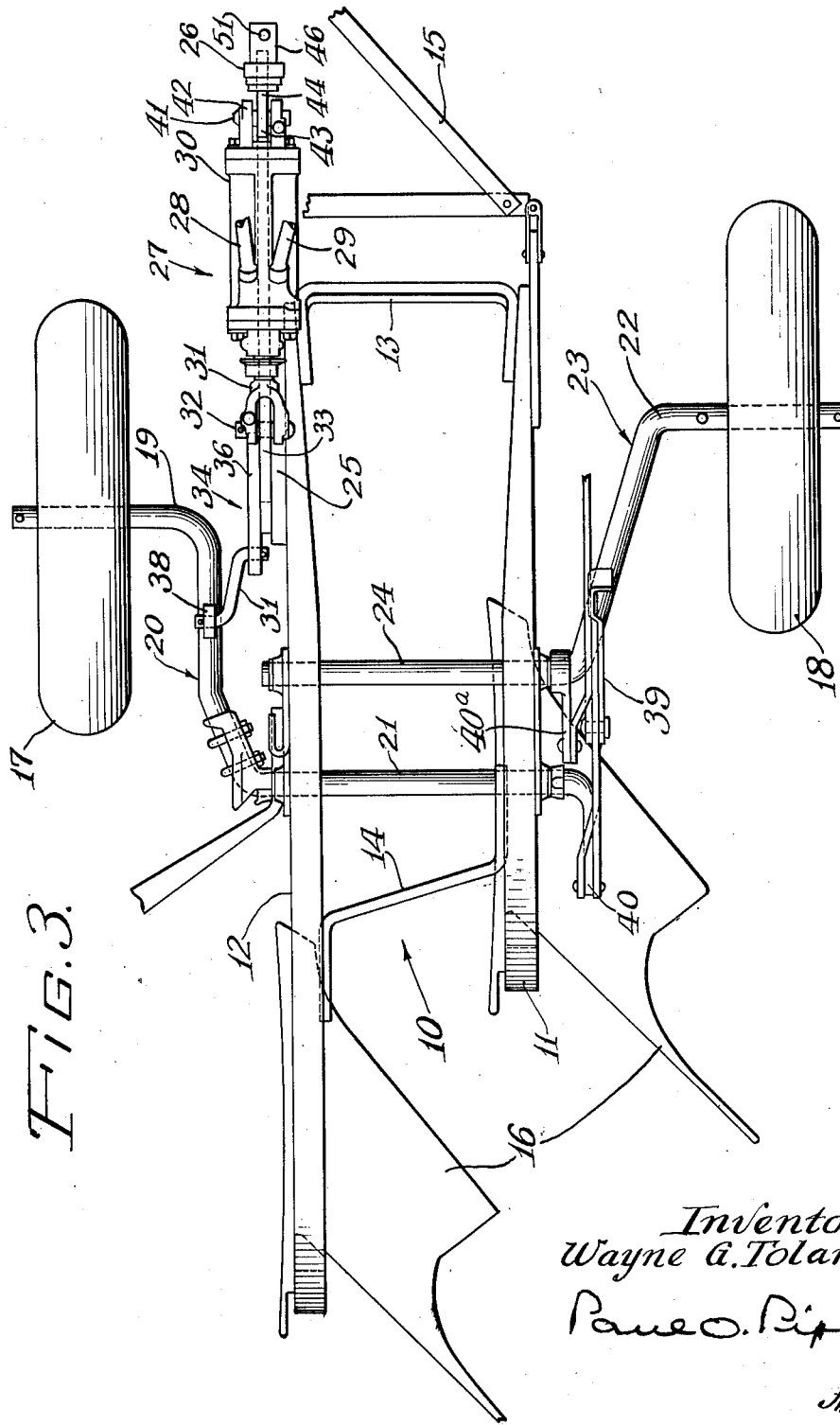
Fig. 3 is a plan view of the structure shown in Fig. 1.

In the drawings, the numeral 10 designates the frame of a plow comprising laterally spaced longitudinally extending beams 11 and 12 connected at their forward ends and near their rear ends by braces 13 and 14, respectively. A hitch structure 15 is provided at the forward end of the frame for connection of the implement to the draw-bar of a tractor. Beams 11 and 12 are bent downwardly at their rear ends and have secured thereto plow bottoms 16.

2

The plow of the present invention is supported upon ground-engaging wheels comprising a land wheel 17 and a furrow wheel 18. Land wheel 17 is mounted upon the bent portion 19 of a crank axle 20 having a transverse portion 21 mounted in bearings secured to the beams 11 and 12, and furrow wheel 18 is mounted upon the bent portion 22 of a crank axle 23 having a transverse portion 24 likewise supported in bearings carried by the beams 11 and 12. The swinging of the crank axles 20 and 23 relative to the plow frame 10 moves the earth-working tools or plow bottoms 16 vertically between operating and transport positions.

Raising and lowering of the earth-working tools is accomplished by mechanism comprising a longitudinally extending bracket 25 secured to the left-hand beam 12 and extending forwardly therefrom. Forming a part of the bracket 25 is an upright portion 26 affixed to the end of the bracket and serving for the mounting of one end of a hydraulically operated ram unit 27 of the double-acting type supplied with fluid under pressure from a source, not shown, upon the tractor or other vehicle by which the implement is drawn. Fluid is supplied to the ram unit through flexible hose 28 and 29. The ram unit and the means by which it is supplied with fluid preferably accommodate holding the piston of the ram unit in a number of selected positions in order to control the vertical position of the earth-working tools.

The ram unit 27 comprises a cylinder 30 and a piston rod 31 slidable longitudinally in the cylinder. The piston rod 31 is bifurcated at its end and removably connected by a pin 32 to the outwardly projecting arm 33 of a movable member in the form of a lever 34 pivotally mounted at 35 upon the bracket 25. Another arm 36 of the lever has connected at its end a link 37 which is pivotally attached at its other end to a lug 38 mounted upon the downwardly extending portion of the crank axle 20.

It has already been noted that swinging of the crank axles 20 and 23 will raise and lower the plow frame 10 and the earth-working tools 16 carried thereby. It should now be clear that power for operating the crank axles is supplied by operation of the piston 31 in the cylinder 30. Extension of the piston 31 relative to the cylinder will cause the lever 34 to move in a counterclockwise direction as viewed in Fig. 1, and such movement will cause the crank axle 20 to which the lever is connected by link 37 to swing downwardly and thus raise the plow bottoms and the plow frame to a transport position relative to the wheels 17 and 18 upon which the implement is supported. Motion is transmitted from the crank axle 20 to crank axle 23 by any suitable connecting means, in this instance a lever and quadrant unit 39 which is connected to an arm 40 secured to the end of the transverse portion 21 of axle 20 and to an arm 40a mounted on the bent portion of the crank axle 23 upon which is mounted the furrow wheel 18. It will thus be clear that upon downward movement of the bent portion 19 of crank axle 20, motion will be transmitted from arm 40 to the arm 40a on transverse portion 24 of crank axle 23 to swing the furrow wheel 18 downwardly also. Adjustments in the relative positions of wheels 17 and 18 may be made by operating the lever and quadrant unit 39.

The cylinder 30 of ram unit 27 is anchored by a pin 41 which passes through spaced lugs 42 at the head of the cylinder and through the eye 43 of an eye-bolt 44 provided with a threaded shank 45 receivable in the threaded interior of a sleeve member 46. Sleeve member 46 is rotatably carried in an opening 47 provided in the upper portion of the bracket portion 26. Sleeve 46 is provided with a broadened shoulder portion 48 which abuts against the bracket portion 26 and is held thereagainst by a plate 49 adjustably secured to the bracket by vertically spaced bolts 50. The sleeve 46 is thus held against displacement from the bracket portion 26. A crank handle 51 is passed through a suitable opening provided in the end of sleeve member 46 by which the sleeve member may be rotated to advance and retract eye-bolt 44. It should thus be clear that in addition to the adjustment of the vertical position of the plow bottom 16 provided by operation of the ram unit 27, further adjustment in operating depth of the tools may be made by manipulating the handle 51, several inches of depth adjustment being provided, motion being transmitted from the eye-bolt 44 through the ram unit 27 to lever 34 and link 37 to swing the crank axles 20 and 23. The position of the plow bottoms may thus be adjusted to selected positions by movement of the bolt 44 and may be held by the cooperation of the threaded shank and the threaded interior of the sleeve 46 in the desired position. In order to prevent rotation of the bolt 44 as the handle 51 is turned, the bolt shank is flattened at the sides as indicated in Fig. 4 and is received in a slot 52 carried in the plate 49.

In addition to serving the function described, the attaching eye-bolt 44 and its associated operating parts likewise function to facilitate attachment and detachment of the ram unit 27 from the implement. It frequently happens that the ram unit must be detached from the plow shown, to be used upon some other implement, and in such case the crank 51 is operated to axially move bolt 44 slightly to take the tension off pins 32 and 41 so that they may be removed. The cylinder is removed when the implement has been raised to transport position, and this position of the operating parts is indicated by the dotted lines in Fig. 1. It will be noted that the lever 34 has swung downwardly about its pivot 35 and that an aperture 53 in an arm portion 54 extending below the pivot 35 comes into alinement with an opening provided in the bracket 25. A pin 55 passed through these alined openings holds the lever 34 against movement about its pivot and retains the frame and associated earth-working tools in their transport position. In returning the ram unit 27 to the implement, the piston 31 may be attached to the lever 34 by insertion of the pin 32 in the alined openings. It frequently happens that the piston 31 is not in the same position with respect to the cylinder 30 as prevailed when the ram unit was removed from the implement. In such case operation of the crank 51 to advance or retract the eye-bolt 44 readily brings the eye of the bolt into alinement with the openings in the lugs 42 of the cylinder head for the reception of pin 41.

From the foregoing description it should be clear that a novel remote control hydraulic ram attachment has been provided for an implement of the trailing type adapted to be connected to a tractor which provides the power for operation of the ram unit. The invention has been described in its preferred embodiment. However, it should be noted that modifications may be made therein without departing from the spirit of the invention or the scope of the appended claims.

What is claimed is:

1. A remote control hydraulic ram attachment for an agricultural implement of the trailing type having a stationary part and a part movable to raise and lower the working tools, comprising means detachably connecting one end of the ram to the movable part, an internally threaded sleeve member rotatably carried by said stationary part, means for holding the sleeve member against axial displacement from the stationary part, an eye-bolt having its threaded shank receivable in said sleeve, means detachably connecting said bolt to the other end of the ram, means for rotating said sleeve to advance and retract the bolt, whereby motion may be transmitted from the eye-bolt through the ram and to the movable part to adjust the operating depth of the working tools independently of the operation of the ram unit and to facilitate attachment and detachment of the ram, and means for holding the movable part against movement upon detachment of the ram.

2. A remote control hydraulic ram attachment for an agricultural implement of the trailing type having a stationary part and a part movable to raise and lower the working tools, comprising means detachably connecting one end of the ram to the movable part, an internally threaded sleeve member rotatably carried by said stationary part, means for holding the sleeve member against axial displacement from the stationary part, an eye-bolt having its threaded shank receivable in said sleeve, means detachably connecting said bolt to the other end of the ram, means carried by said stationary part accommodating axial movement of the bolt for holding said bolt against rotation, and means for rotating said sleeve to advance and retract the bolt, whereby motion may be transmitted from the eye-bolt through the ram and to the movable part to adjust the operating depth of the working tools independently of the operation of the ram unit.

3. A remote control lift attachment for adjusting the depth of operation of the working tools of an agricultural implement of the trailing type having a stationary part and a part movable to raise and lower the tools, comprising an internally threaded sleeve member rotatably carried by the stationary part, means for holding the sleeve member against axial displacement from the stationary part, an eye-bolt receivable in said sleeve and extendable and retractable by rotation of the sleeve, means carried by said stationary part for holding the eye-bolt against rotation, a cylinder and piston unit wherein the piston is retainable in selected positions in the cylinder to hold the tools in adjusted position, means detachably connecting the ends of said cylinder and piston unit to the eye portion of the bolt and to the movable member, whereby upon rotation of the sleeve member the tools may be moved to selected positions in addition to the adjustments provided by operation of the cylinder and piston unit, and means for holding the movable part against movement upon removal of the cylinder and piston unit from the implement.

WAYNE G. TOLAND.

References Cited in the file of this patent

UNITED STATES PATENTS

| Number | Name | Date |
| --- | --- | --- |
| 2,320,742 | Newkirk | June 1, 1943 |
| 2,358,298 | Benjamin | Sept. 19, 1944 |
| 2,410,918 | Acton | Nov. 12, 1946 |
| 2,532,577 | Silver et al. | Dec. 5, 1950 |